United States Patent [19]

Majicek

[11] 4,219,169
[45] Aug. 26, 1980

[54] FLOATING ROLLER MAGNETIC TAPE CARTRIDGE

[75] Inventor: Stepan Majicek, San Jose, Calif.

[73] Assignee: Verbatim Corporation, Sunnyvale, Calif.

[21] Appl. No.: 969,183

[22] Filed: Dec. 14, 1978

Related U.S. Application Data

[63] Continuation-in-part of Ser. No. 850,254, Nov. 10, 1977, Pat. No. 4,146,194.

[51] Int. Cl.³ .................. G11B 15/32; G11B 23/08
[52] U.S. Cl. .................................................. 242/192
[58] Field of Search ............. 242/192, 199, 200, 71.2, 242/210, 67.5

[56] References Cited

U.S. PATENT DOCUMENTS

| | | | |
|---|---|---|---|
| 2,919,866 | 1/1960 | Minott, Jr. | 242/192 |
| 3,528,625 | 12/1970 | Bumb, Jr. | 242/192 |
| 3,802,647 | 4/1974 | Esashi et al. | 242/199 |
| 3,907,230 | 9/1975 | Merle et al. | 242/192 |
| 4,089,488 | 5/1978 | Isikawa | 242/192 |

Primary Examiner—George F. Mautz
Attorney, Agent, or Firm—Freilich, Hornbaker, Wasserman, Rosen & Fernandez

[57] ABSTRACT

A tape cartridge of the floating roller type, wherein the floating roller is supported in a highly stable manner. The floating roller has axial bearings projecting at its opposite ends, with at least one bearing having a wide flat surface that stabilizes the roller against tipping. The roller bears against tape rolls wound upon reels that have small flanges that aid in starting the tape ends on the reels, and the floating roller has a recess at the level of the flanges to enable the periphery of the roller to move substantially against the tape-supporting surface of the reel. A substantially transparent cartridge housing has slightly raised pads that support the axial bearings on the floating roller, the pads having textured surfaces that avoid noticeable marring by the floating roller bearings.

10 Claims, 5 Drawing Figures

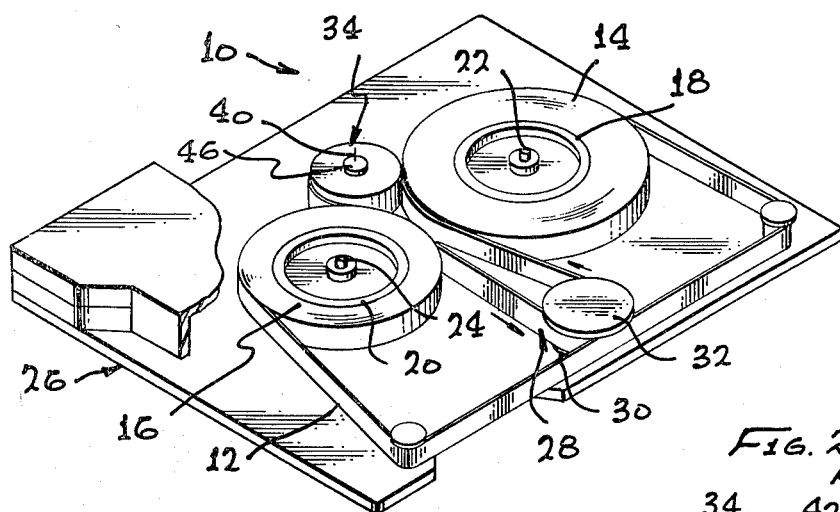
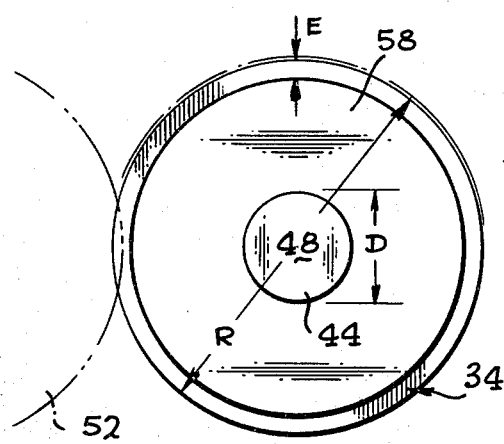
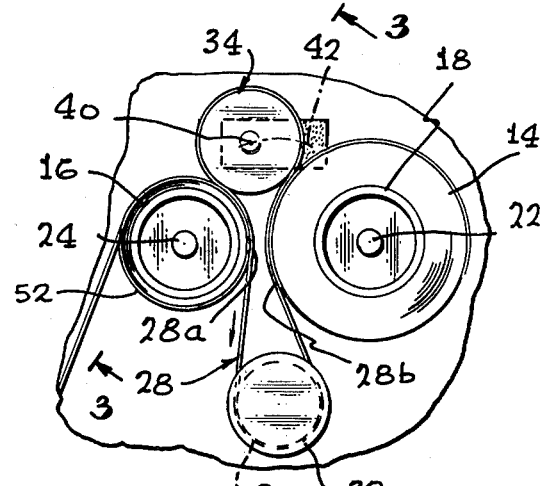
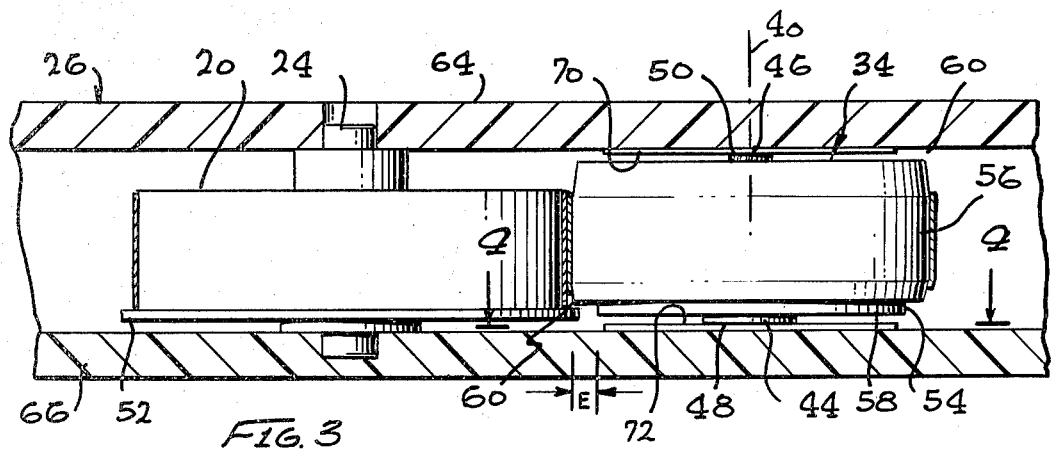

FLOATING ROLLER MAGNETIC TAPE CARTRIDGE

CROSS REFERENCE TO RELATED APPLICATION

This is a continuation in part of U.S. Pat. application Ser. No. 850,254 filed Nov. 10, 1977, now U.S. Pat. No. 4,146,194.

BACKGROUND OF THE INVENTION

This invention relates to tape cartridges of the floating roller type.

One type of belt driven tape cartridge utilizes a drive belt that extends about a driven roller and an idling or floating roller, and which bears against the rolls of tape to turn them. The axis of the floating roller shifts position as tape moves from one type roll to the other, and the floating roller is typically provided with small axial projections at its opposite ends to rotatably support the roller on the cartridge housing. This allows the axis of the roller to shift position, so that it can approach closely against the periphery of each of the tape-supporting reels when almost all of the tape is unwound therefrom, the reels typically having flangeless peripheries to permit very close approach by the floating roller. An example of a cartridge of this type is shown in U.S. Pat. No. 3,907,230. It has been found that problems can arise in prior floating roller cartridges, in assuring stability of the floating roller against tipping, in the starting of tape on the flangeless reels, and in the creation of unsightly scratches on the cartridge housing.

SUMMARY OF THE INVENTION

In accordance with one embodiment of the present invention, a floating roller tape cartridge is provided wherein the floating roller is supported in a stable manner. The floating roller has axial bearings at its opposite ends, with at least one bearing having a wide flat surface bearing against the cartridge housing to help avoid tipping of the roller.

The reels which hold rolls of tape, can be provided with small flanges that aid in starting the tape. A recess is formed in the periphery of the floating roller at one end thereof, which is slightly deeper than the reel flanges, to permit the floating roller to enter beyond the flanges to press on the beginning of the tape rolls. The small recess does not greatly reduce the diameter of the floating roller end portions, so that the end portions can prevent extreme tipping of the floating roller when the cartridge is subjected to a large shock. The cartridge housing has slightly raised pads that support the axial bearings on the floating roller. The surfaces of the pads have a pattern of fine recesses therein, to avoid apparent scratching and wearing of the pad surfaces by the floating roller bearings.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a tape cartridge constructed in accordance with the invention, with most of the upper housing portion cut away.

FIG. 2 is a partial plan view of the cartridge of FIG. 1.

FIG. 3 is a view taken on the line 3—3 of FIG. 2.

FIG. 4 is a view taken on the line 4—4 of FIG. 3.

FIG. 5 is an enlarged view of a portion of FIG. 3.

DESCRIPTION OF THE PREFERRED EMBODIMENT

FIG. 1 illustrates a tape cartridge 10 constructed in accordance with the present invention, which includes a tape 12 that moves along a predetermined path between a pair of tape packs or rolls 14, 16 that are wound on a pair of reels 18, 20. The tape reels are rotatably mounted on a pair of axles 22, 24 that are held on a cartridge housing 26. The tape is driven by a drive belt 28 that extends around a crowned portion 30 of a drive roller 32 that rotates about a fixed axis, and around a floating roller 34. The drive belt 28 bears against the tape rolls 14, 16 to drive them. The belt is under tension, and therefore also pulls the floating roller 34 towards the tape rolls, so that the floating roller 34 presses the belt 28 against the tape rolls.

The axis of rotation 40 of the floating roller shifts position along the path 42 (FIG. 2) as the tape unwinds from one tape roll onto the other. Accordingly, axial bearings 44, 46 (FIG. 3) are provided to rotatably support the floating roller on the cartridge housing 26 as the floating roller shifts position. In prior art floating roller cartridges, the floating roller was provided with tapered axial bearings having small contact areas against the cartridge housing, to minimize rotational friction of the floating roller. However, in the floating roller 34 of the present invention, the axial bearings 44, 46 have flat axial ends 48, 50 bearing against the cartridge housing.

The wide flat ends or faces 48, 50 of the floating roller, and particularly the widest face 48, is provided to stabilize the orientation of the floating roller to prevent tipping. Normally, the floating roller is supported against tipping by reason of its contact with the drive belt 28 where the roller presses the drive belt against the tape rolls. However, some imprecision in the construction of parts can lead to a tendency for the roller to tip, and this can be aggravated by large temperature and humidity changes and even by small shocks encountered during handling of the cartridge. The use of a wide bearing face 48 enables the roller to resist tipping and therefore operate in a reliably stable manner.

The increased friction resulting from the wide bearing face such as 48 of the floating roller, is found not to significantly hinder smooth operation of the cartridge. A considerable amount of retardation of roller rotation is, in fact, necessary for the proper operation of the cartridge. Retardation of the floating roller causes slight elongation of one side 28a (FIG. 2) of the drive belt as compared to the other side 28b. This tends to cause the take up tape roll 16 to turn slightly faster than the supply tape roll 14, so that there is never any slack in the tape. Such retardation of the floating roller and of the drive belt can arise from sources such as compression of the tape rolls and of the drive belt by the floating roller. Thus, the additional retardation produced by the wide bearing face 48 only adds to the required retardation of the floating roller. It may be noted that retardation arising from friction tends to vary more than retardation from certain other phenomena that are present, but since the frictional retardation may be only a minor component of the total retardation, it has not been found to significantly affect the tape cartridge performance. The diameter D (FIG. 4) of the bearing face 48 is preferably more than 10% of the total diameter R of the periphery of the floating roller which contacts the tape rolls, to provide a wide area that avoids tipping of the floating roller. In the particular floating roller 34, the widest face 48 has a diameter about 25% that of the periphery of the roller, while the narrower upper face 50 has a diameter about half as great as the face 48.

The use of flanges on tape reels is normally desirable to aid in starting the tape on the reels. However, in floating roller cartridges wherein the floating roller must substantially bear against the reel when it has only a few turns or less of tape thereon, flanges have been avoided. Each of the reels such as 20 shown in FIG. 3, is provided with a flange 52 that aids in starting the tape thereon. The floating roller 34 is formed with a recess 54 at one end of its outer surface, to receive the flange 52 so that the outer periphery 56 of the roller can move beyond the reel flange to a position substantially against the reel. The recess 54 is of a radial depth E slightly greater than the radial depth of the flange 52, to leave a floating roller intermediate portion 58 that lies just above the bearing 44, of a diameter almost as great as the periphery 56 of the roller. This intermediate portion 58 is useful in safeguarding the roller against large tipping when the cartridge is subjected to a large shock such as when it is dropped on a floor. In the case of such a shock, the opposite corners such as 60 and 62 of the floating roller will prevent tilting of the roller by more than several degrees, which may prevent permanent damage to the cartridge. The axial bearings 44, 46 are of a small height such as 15 mil (thousandths of an inch) or less for a floating roller of a total height of about 250 mil, or in other words each end bearing has a height of less than 10% of the total height of the floating roller. The end portion 58 of the floating roller has a width which is a majority of the maximum width of the floating roller.

In order to provide precision surfaces on which the floating roller can turn, the upper and lower parts 64, 66 of the cartridge housing 26 are provided with slightly raised bearing pads 70, 72. The flat surfaces 48, 50 of the floating roller substantially bear against these pads. The cartridge housing 26 is constructed of clear plastic material, although it can contain some slight coloring and have textured surfaces. The clear plastic material enables the user to view the cartridge to easily determine how much tape has been wound onto each roll, and also to add confidence to the user that the cartridge is in good condition. However, the bearings 44, 46 of the floating roller can wear against the faces of the pads 70, 72 and produce scratch marks thereat. Such markings may indicate to a purchaser that the cartridge is defective, even though slight scratching occurred during testing, or may indicate to the user that the cartridge is worn out when it is still in a good condition. To avoid such an indication, each of the pads such as 72 shown in FIG. 5, is provided with multiple recess 72' that provide a textured appearance. Accordingly, slight uneven wearing away of the pad surface does not cause noticeable scratches in the pad that might erroneously indicate that the cartridge is worn.

Thus, the invention provides a rugged and durable floating roller cartridge. Stability of the floating roller is enhanced by providing axial bearings at opposite ends thereof, wherein at least one of the bearings has a wide flat surface that is preferably at least 10% of the width of the entire floating roller, to avoid tipping of the roller. The tape reels can be provided with small flanges that aid in starting the tape, by providing a recess at one end of the floating roller periphery, to enable the floating roller to move beyond the flanges. The recess is preferably small, so that the intermediate portion of the floating roller inside the axial bearing thereof, has a diameter of more than half the maximum diameter of the floating roller cartridge, so that it can aid in preventing diastrous tilting of the floating roller in case the cartridge is subjected to a large shock. The axial bearings of the floating roller can be supported on cartridge housing areas that are textured, to avoid noticeable scratching thereof, particularly where the cartridge housing is formed of a substantially transparent material.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a floating roller cartridge which includes a drive belt that extends about floating and drive rollers and against the tape rolls that lie about tape reels which are rotatably mounted on a housing, the improvement wherein:
    said floating roller has axial bearings projecting at opposite ends thereof which are fixed to said floating roller and rotatable on said housing, with at least one of said axial bearings having a substantially flat end surface.

2. The improvement described in claim 1 wherein:
    said flat end surface has a diameter at least ten percent of the outer diameter of the floating roller.

3. The improvement described in claim 1 wherein:
    said axial bearings each have a height less than one-tenth the total height of the floating roller, whereby to resist large tipping of the roller in the event the cartridge is subjected to a large shock.

4. A floating roller cartridge comprising:
    a housing having upper and lower parts;
    a pair of tape reels rotatably mounted on the housing;
    a drive roller rotatably mounted on the housing;
    a tape having opposite end portions forming tape rolls wound onto said reels;
    a floating roller; and
    a drive belt extending about said drive and floating rollers and bearing against said tape rolls, said belt holding said floating roller adjacent to said tape rolls;
    said floating roller having axial bearings projecting from its opposite ends and bearing respectively against said upper and lower housing parts, at least one of said bearings having a substantially flat face which has a substantially circular periphery of a diameter at least one-tenth the outer diameter of the floating roller.

5. In a floating roller cartridge which includes a drive belt that extends about floating and drive rollers and against the tape rolls that lie about tape reels which are rotatably mounted on a housing, the improvement wherein:
    said floating roller has axial bearings projecting at opposite ends thereof, and said housing is transparent to the extent that scratches on the inside surface of the housing along the path of the floating roller axial bearings would be noticeable, and the inner surfaces of the housing have multiple fine recesses that form textured surfaces along the paths of the axial bearings of the floating roller.

6. The improvement described in claim 5 wherein:

said axial bearings of said floating roller have flat faces.

7. In a floating roller cartridge which includes a drive belt that extends about floating and drive rollers and against the tape rolls that lie about tape reels which are rotatably mounted on a housing, the improvement wherein:

said floating roller has axial bearings projecting at opposite ends thereof, with at least one of said axial bearings having a substantially flat end surface; and said housing has opposite inside faces forming raised pads that are raised beyond most of the inside face of the housing, said pads positioned to rotatably support said axial bearings as they shift position during the movement of tape from one roll onto the other.

8. The improvement described in claim 7 wherein:

said housing is substantially transparent, and the surfaces of said raised pads have multiple recesses forming a textured surface.

9. In a floating roller cartridge which includes a drive belt that extends about floating and drive rollers and against the tape rolls that lie about tape reels which are rotatably mounted on a housing, the improvement wherein:

said floating roller has axial bearings projecting at opposite ends thereof, with at least one of said axial bearings having a substantially flat end surface;

said tape reels have flanges at a first end thereof; and said floating roller has a radially outer surface, and has a recess at one end of said outer surface adjacent to a corresponding axial bearing and at the same level as the reel flanges to receive the flanges, said recess being of greater radial depth than said reel flanges but of small enough depth to leave an intermediate roller portion of a diameter greater than one half the maximum diameter of the floating roller.

10. In a floating roller cartridge which includes a drive belt that extends about floating and drive rollers and against the tape rolls that lie about the tape reels which are rotatably mounted on a housing, the improvement wherein:

said reels have narrow flanges at first axial ends thereof, that extend radially outwardly beyond the tape-engaging middle of the reel by a slight distance of less than one-half the radius of the reel, so that the flanges can aid in starting the tape on the reels;

said floating roller has a roller periphery that is constructed to extend radially beyond alternate reel flanges when almost all tape has unwound therefrom, to maintain substantially contact engagement with the small diameter tape roll about the corresponding reel; and said floating roller has axial bearings at its opposite ends and has an intermediate roller portion lying at the same level as said reel flanges and between one of said axial bearings and said roller periphery, said intermediate roller portion having a diameter more than half the diameter of said roller periphery.

* * * * *